Sept. 4, 1956 K. B. WELCH ET AL 2,761,176
METHOD AND COMPOSITION FOR THE PRODUCTION
OF SPECKLED PLASTIC WARE
Filed April 6, 1954
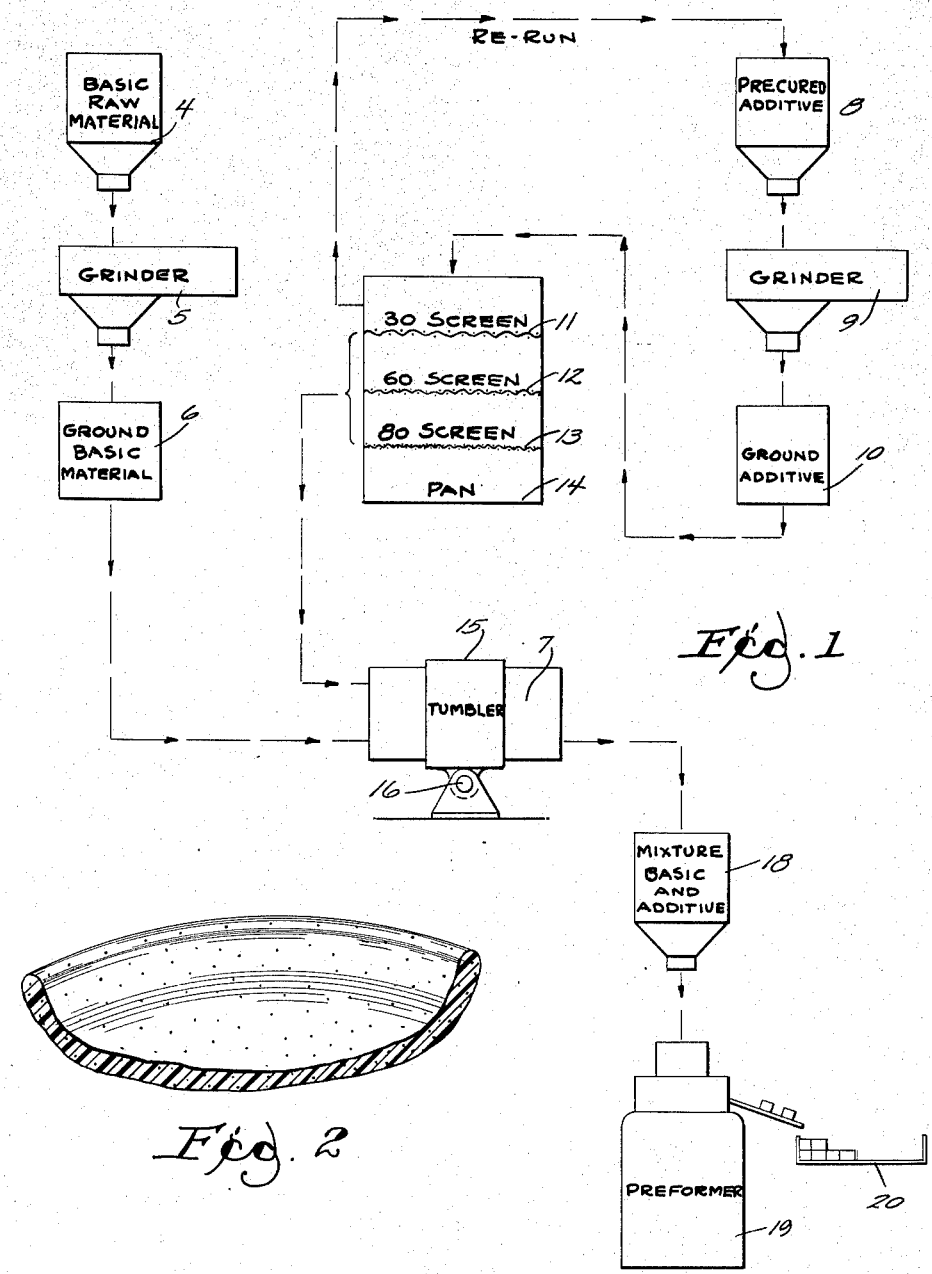
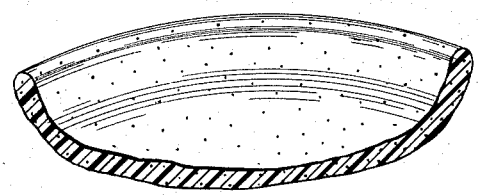
*Fig. 2*
INVENTORS
KENNETH B. WELCH
ROGER R. SACIA
BY
Wheeler, Wheeler & Wheeler
ATTORNEYS United States Patent Office 2,761,176
Patented Sept. 4, 1956

2,761,176

METHOD AND COMPOSITION FOR THE PRODUCTION OF SPECKLED PLASTIC WARE

Kenneth B. Welch and Roger R. Sacia, West Bend, Wis., assignors to Kenro Corporation, Fredonia, Wis.

Application April 6, 1954, Serial No. 421,392

9 Claims. (Cl. 18—47.5)

This invention relates to a method and composition for producing a molded plastic product with speckled texture.

Over a period of years numerous attempts to produce a satisfactory speckled texture in plastic moldings have met with failure either because the speckles could not be uniformly distributed, or because they were blotchy or because the color of the additive was undesirably diffused. The present invention seeks to produce a satisfactory product with uniform distribution of speckles and diffusion absent or controllable and produced by a method which assures substantial uniformity of results.

Several techniques are involved, including particularly a selection of grain size of the additive, this invention being based in part on the discovery that any substantial variation in range of grain size of the basic material in relation to grain size of additive will result in gravity segregation, and will thereby destroy uniformity.

Another feature of the invention consists in giving the additive thermosetting material a slightly greater preset than is given the basic stock.

In the drawings:

Fig. 1 is a flow diagram.

Fig. 2 is a fragmentary detailed view in plan of a product made in accordance with this invention.

The details of the improved method are as follows:

The invention is particularly concerned with thermosetting plastics, of which melamine formaldehyde and urea formaldehyde are examples. For purposes of exemplification, it may be assumed that both the basic stock and the additive are melamine formaldehyde.

In their initial manufacture, these plastics are supplied in the form of pieces of varying size, which are ground to usable granules and preformed prior to the actual thermosetting molding. For the purposes hereof, American Cyanamid Co., the manufacturer of such material, subjects the additive material to a partial cure at about 150° F. In some instances the base material is also partially cured but in such cases the additive has more pre-cure. Even when the basic material has no pre-cure at all it may be referred to as less pre-cured than the additive, there being desirably in all instances, a differential from the standpoint of flowability during use in this process. The differential in pre-cure results in retarding flow of the additive as compared with the basic material, thereby controlling diffusion. Diffusion is also controlled by the grain size selection hereinafter described.

The basic raw material passes from the storage bin 4 to a grinder 5 and is collected at 6 for delivery into the mixing tumbler 7. As collected from the particular grinder which we have used, the material comprises a wide range of grain sizes.

In the basic material, the grain size is not at all critical. By way of exemplification, we find that the basic material is such that about eighty percent of it will fail to pass an eighty mesh screen, whereas not more than forty percent fails to pass a number 16 screen. In many instances, however, the material is much finer than would be indicated by the foregoing. The granules should be of sufficient fineness to hold in suspension the additive materials of grain sizes selected in the manner hereinafter described. If the basic material were to comprise only very coarse grains, the additive would tend to settle out. However, the invention is practiced successfully by using random granule sizes as they come from the grinder without the selection desirably practiced on the additives. The additive granules are then passed through a series of screens at 11, 12 and 13. By way of preferred example, screen 11 may be 30 mesh; screen 12, 60 mesh; and screen 13, 80 mesh. It is possible to use granules of additive ranging from a maximum of 20 mesh to a minimum of 120 mesh, but these are the practical limits at which desired results are achieved. It is preferred to use granules between 30 and 80 mesh. In our practice, fines which pass freely through the 80 mesh screen are collected in a pan 14 and are not normally used in this process.

Collected granules in the desired range, for example, those granules which pass the 30 mesh screen but are too large to pass the 80 mesh screen, are delivered to the mixing tumbler 7 in proper proportion by weight to the amount of ground basis material which is delivered to the tumbler in the same batch.

It will be understood that the coarser granules segregated by the screening operation are collected from screen 11 and returned to hopper 8 and grinder 9, whereby they are again crushed and re-screened to salvage as much as possible of the material falling within the selected grain size. Only the fines, below the selected range, are discarded or used for other procedures. The inclusion of fines materially smaller than 80 mesh results in a tendency to cause tinting or diffusion between the colors of the base material and the additive.

The material used for the additive will ordinarily have a color distinctly different from that of the base material and may otherwise be of the same general nature.

It may be mentioned that the tumbler 7 has been especially designed to be rotatable in a bearing 15 which, during barrel rotation, is oscillated on pintle 16 to throw the material from one end of the tumbler barrel to the other to promote thorough mixing of the basic material and additive. Any other apparatus or method which will assure thorough mixing will suffice for the purposes of the present disclosure.

The proportions of additive and basic material desirably used will depend somewhat upon the transparency or opaqueness of the basic material color. Where the basic material is white or yellow, it has been found satisfactory to use additive in the amount of .4% by weight. Where the basic material is medium blue, the amount of additive may be .45% by weight. If the basic material is relatively deeply colored, deep red for example, the amount of additive may be 3.45% by weight. It will be understood, of course, that the particular proportions are a matter of judgment to produce the desired artistic effect and do not constitute limitations on the present invention. Proportions stated are given for the guidance of the operator, and by way of example, and not by way of limitation.

Having mixed the grains of the pre-cured additive with the grains of the less pre-cured basic material, the resulting composition may be flowed by gravity into hopper 18 and thence into the preforming mold 19, from which the speckled preformed tablets issue onto the collecting table 20. While the present invention is not concerned with preforming, it may be stated that in practice, the tablets or biscuits are preformed cold under a total pressure of about one hundred tons. They are then pre-heated until they crack open at a temperature estimated at 180 to 200 degrees F. They are then transferred to the mold, which operates at a temperature of about 325 degrees. In general, the preforming and molding operations are standard procedures, subject to many variations depending on the condition of the raw material. Because of the careful selection of grain sizes of the additive, the distribution of the additive throughout the basic stock remains uniform during handling.

Plastic plates and other tableware produced by this process have the additive particles distributed with great uniformity of size and spacing throughout the article. The speckles formed by the additive have sharply delineated outlines with no appreciable blending of the colors.

By varying the selection of grain sizes of the additive, as well as by varying the amount of precuring, different effects may be produced. If, for example, diffusion is desirable, rather than undesired, it may be had by using additive grain sizes which include, or consist entirely of, the fines.

Other changes may be made in the procedures above outlined on the basis of this disclosure of the principles of selection.

We claim:

1. A method of molding speckle ware which comprises crushing a thermosetting plastic base material, screening granules of a thermosetting additive of color different from the base material and selecting the granules thereof within a range of 20–120 mesh, mixing said selective additive granules with both coarse and fine granules of the crushed base material, and subsequently molding the mixture under heat and pressure, said base material and said additive having different degrees of curing.

2. The method of claim 1 in which the range of grain size of the additive lies between 30 and 80 mesh.

3. The method recited in claim 1 in which the additive granules comprise partially precured thermosetting material having restricted flow as compared with the granules of the base material.

4. A method of molding speckle ware which comprises crushing a thermosetting plastic base material, screening partially precured granules of an additive thermosetting material of color different from the base material and selecting the granules thereof within a range of 20–120 mesh, the granules of said base material having less precure than those of said additive, mixing said selected additive granules with random granule sizes including both course and fine granules of the crushed base material and subsequently molding the mixture under heat and pressure.

5. The method of making thermosetting plastic speckled ware, which method comprises separately grinding a partially precured thermosetting additive and a relatively less cured thermosetting granular material selecting from the ground additive granules grains of a particle size between 20 mesh and 120 mesh, adding to and thoroughly mixing with a random mixture of both coarse and fine granules of the ground granules of basic material a small percentage of the selected grains of additive material, and molding an article from the resulting mixture under heat and pressure.

6. The method of claim 5 in which the selected sizes of the granules of the additive lie within the range of 30 to 80 mesh.

7. A moldable composition comprising incompletely cured thermosetting material in a mixture which includes both coarse and fine granules of predetermined color having substantially uniformly distributed throughout its mass granules of an additive partially precured thermosetting material of different color and of a size falling within a range of sizes lying between 20 mesh and 120 mesh, said additive granules being adapted on molding to form speckles visible at the surface of the base material with relatively sharply delineated margins.

8. The composition of matter defined in claim 7 in which the grain size of the additive lies between 30 mesh and 80 mesh.

9. A moldable composition comprising incompletely cured granular thermosetting base material of predetermined color having substantially uniformly distributed throughout its mass granules of an additive precured thermosetting material of different color and of a size falling within a range of sizes lying between 20 mesh and 120 mesh, the said additive granules being adapted on molding to form speckles visible at the surface of the base material with relatively sharply delineated margins the additive comprising from 0.4% to 3.45% of the weight of the composition and the base material containing an adequate percentage of fines to prevent the additive from settling out.

References Cited in the file of this patent

UNITED STATES PATENTS

| | | |
|---|---|---|
| 1,454,939 | Michaelsen | May 15, 1923 |
| 1,735,674 | Copeland | Nov. 12, 1929 |
| 1,898,515 | Albright | Feb. 21, 1933 |
| 1,996,757 | Elbel | Apr. 9, 1935 |
| 2,083,201 | Poppe | June 8, 1937 |
| 2,571,193 | Broderson | Oct. 16, 1951 |